Patented Sept. 18, 1945

2,385,258

UNITED STATES PATENT OFFICE 2,385,258

SUBSTITUTED ACRYLONITRILE POLYMERS

Albert M. Clifford, Stow, Ohio, assignor to Wingfoot Corporation, Akron, Ohio, a corporation of Delaware No Drawing. Application May 15, 1942,
Serial No. 443,093

13 Claims. (Cl. 260—83)

This invention relates to plastic masses prepared from certain monomeric materials by polymerization or copolymerization thereof. More particularly, it relates to polymers of alpha substituted acrylonitriles either alone or interpolymerized with other monomers.

In the preparation of rubber-like masses from acrylonitrile and butadiene, it is found that the copolymers thus obtained are extremely tough and require special processing to render them capable of being handled in the manner customarily employed in manipulating natural rubber. More workable synthetic rubbers of the acrylonitrile type are desirable and it has now been found that such rubbers may be prepared by employing, in place of acrylonitrile, its alpha homologues in which the acrylonitrile carries a furyloxy or furfuryl-oxy or hydrocarbonoxy substituent. By the term "hydrocarbonoxy" it is intended to include alkyloxy, aryloxy, cycloalkyloxy, alicyclicoxy, and like substituents. It will be noted that each of these groups is made up chiefly of hydrocarbon but also contains oxygen and the term includes other substituents conforming to the definition.

When a compound of the type just defined is polymerized alone or, better, with another monomer, it is found that the "rubbers" obtained are much softer and more readily workable than those obtained by the use of acrylonitrile itself.

The polymers may be prepared by any of the methods customarily employed in this type of manufacture, preferably by emulsion polymerization wherein the monomers are heated to a temperature ranging from 25–80° C., but preferably between 35° and 45° C., in an aqueous emulsion containing an emulsifier, such as Aquarex D or Duponol and an oxidant, such as sodium perborate or benzoyl peroxide. Other ingredients are also present in the emulsion and will be referred to hereinafter. (Aquarex D is a sodium salt mixture of sulfate mono-esters of a mixture of higher fatty alcohols consisting chiefly of the lauryl and myristyl derivatives. Duponol is a more concentrated form of the same. Both products are manufactured by E. I. du Pont de Nemours and Company.)

The alpha hydrocarbonoxy acrylonitriles can be prepared by first treating an alpha, beta dibromo dialiphatic ether with a cyanide to replace one atom of bromine with a nitrile radical to form an alpha cyano beta bromo ether or beta bromo alpha hydrocarbonoxy propionitrile. This cyano ether may then be treated with a dehydrobrominating agent, such as pyridine or quinoline to remove hydrogen bromide, thus producing the alpha hydrocarbonoxy acrylonitrile. For example, 378 grams of alpha, beta dibromethyl ethyl ether were added with stirring over a period of one hour and twenty minutes to a suspension of 147 grams of CuCN and 300 cc. of anhydrous ethyl ether. The mixture was stirred and refluxed for another hour and forty minutes. The ether was distilled off, and the crude beta brom, alpha ethoxy propionitrile was distilled out of the reaction mixture under reduced pressure. 178 grams of this crude product were mixed with 100 grams of pyridine and 2 grams of diphenyl para phenylene diamine (antioxidant). This mixture was heated for one and one-half to two hours on a steam bath in a flask fitted with a reflux condenser. At the end of this period the product was distilled out of the reaction mixture under reduced pressure and was washed with dilute hydrochloric acid to remove unreacted pyridine. The crude product was dried and fractionated under reduced pressure to produce the alpha ethoxy acrylonitrile. The new hydrocarbonoxy acrylonitriles and the method of producing them are covered in Long application Serial #399,677, filed June 25, 1941, now Patent No. 2,326,373.

To illustrate the preparation of the improved rubbers the following examples are given:

Example 1

To a solution of 10 cc. of 6% sodium lauryl sulfate in 4 ounce glass bombs was added 10 cc. of a McIlvaine type phosphate-citrate buffer. There was also added 0.48 cc. of carbontetrachloride, 0.5 cc. of 5% sodium cyanide solution, 0.5 cc. of 10% acetaldehyde and 0.133 gram of sodium perborate. Sixteen grams of a mixture of monomers made up of 9.6 grams of butadiene and 6.4 grams of the alpha substituted acrylonitrile, a 60/40 ratio, was then put into the emulsion, the butadiene being added last, in the liquid state, to the chilled mixture of the other ingredients. After closure the temperature of the bomb was maintained, during agitation, at 38° C. until polymerization to a desired yield was accomplished. The following results were obtained with the alpha-substituted acrylonitrile indicated, the other constituent being, of course, butadiene-1,3.

| Monomer | Hours | pH of latex | Percent yield |
|---|---|---|---|
| Alpha ethoxy acrylonitrile | 288 | 6.3 | 90 |
|  | 288 | 7.3 | 72.5 |
|  | 288 | 7.5 | 93.5 |
|  | 288 | 7.4 | 87.2 |
| Alpha methoxyacrylonitrile | 70 | 5.5 | 91.5 |
|  | 70 | 5.9 | 91.0 |
|  | 70 | 6.9 | 77.9 |
|  | 70 | 7.6 | 61.5 |
| Alpha n-butoxy acrylonitrile | 19 | 6.0 | 85.6 |
|  | 19 | 6.8 | 89.2 |
|  | 19 | 8.2 | 58.7 |
|  | 19 | 8.1 | 61.8 |

Example 2

A polymerization on a larger scale was conducted of alpha ethoxy acrylonitrile, the batch being run in a five gallon glass-lined autoclave. Into this were placed one liter of water, 30 grams of sodium lauryl sulfate, 6.7 grams of sodium perborate, 24 grams of carbontetrachloride and 14.2 grams of disodium phosphate. To the emulsion thus made up were then added 371 grams of alpha ethoxy acrylonitrile and 630 grams of butadiene-1,3. The charge was heated in an autoclave for a period of 8 days at a temperature of 40° C., whereafter the resulting latex was coagulated by the addition of ethyl alcohol, 15 grams of phenyl beta naphthylamine was added, and the interpolymer was then vacuum dried. A yield of 803 grams or 80% of the theoretical was obtained.

Example 3

The copolymer obtained in the foregoing example was then compounded as follows:

|  | Grams |
|---|---|
| Copolymer | 102.0 |
| Sulfur | 1.6 |
| Stearic acid | 2.0 |
| Benzothiazyl diethyl sulfonamide | 0.8 |
| Carbon black | 40.0 |

The cured rubber thus obtained was then subjected to physical testing and the data obtained was tabulated as follows:

| Cure min. @ °F. | Tensile, kg./cm.$^2$ | Elong., percent | Kg. @ 300% | Extrusion plasticity |
|---|---|---|---|---|
| 35/260 | 15 | 900 | 13 |  |
| 50 | 46 | 1,075 | 18 | 0.187 |
| 70 | 130 | 850 | 31 |  |
| 100 | 123 | 530 | 49 |  |

In addition to the results obtained on the cured rubber from alpha ethoxy acrylonitrile+butadiene, the alpha methoxy acrylonitrile+butadiene and alpha n-butoxy acrylonitrile+butadiene rubbers of Example 1 were cured for 70 minutes at 260° F. and gave rubbers with tensiles of about 100 kg./cm.$^2$. All three of the copolymers were characterized by good plasticity and excellent processing qualities.

Other plastic materials which are embraced within the scope of the invention and fall within the class defined are those obtainable by mass polymerization of one or more individuals of the alpha hydrocarbonoxy acrylonitrile type, such as alpha methoxy acrylonitrile, alpha ethoxy acrylonitrile, alpha propoxy acrylonitrile, alpha n-butoxy acrylonitrile, alpha isobutoxy acrylonitrile, alpha phenoxy acrylonitrile, alpha naphthoxy acrylonitrile, alpha benzyloxy acrylonitrile and alpha cyclohexyloxy acrylonitrile.

Any of the foregoing and other alpha hydrocarbonoxy acrylonitriles may be copolymerized with each other or with other monomeric substances, particularly those which may be termed polymerizable substituted ethylenes wherein the ethylene carries various organic substituents. Among these are butadiene, isoprene, 2-3-dimethyl butadiene, 2-chloro butadiene, 2-3-dichloro butadiene, styrene, acrylonitrile, methacrylonitrile, ethacrylonitrile, the acrylates and alpha alkyl acrylates, such as methyl acrylate, ethyl acrylate, methyl methacrylate, ethyl methacrylate, and the halogen substituted styrenes, such as the ortho, para and meta chloro styrenes and the ortho, para and meta bromo styrenes. Certain of the foregoing compounds may be aptly termed vinyl compounds or substituted vinyl compounds and these are especially useful in the formation of copolymers or interpolymers with the alkoxy acrylonitriles.

This application is a continuation-in-part of application Serial No. 393,776, filed May 16, 1941.

While there have been described above certain preferred embodiments of the invention, it will be realized that the same is not limited thereto but that the ameliorating effect of the presence of a hydrocarbonoxy substituent in the alpha position of acrylonitrile may be availed of in a wide variety of such substituents and particularly in connection with numerous other monomeric substances which may be interpolymerized with the substituted acrylonitrile to yield useful plastic masses, particularly those of rubber-like character. It will be apparent to those skilled in the art that various modifications and changes may be made without departing from the spirit of the invention or from the scope of the appended claims.

What I claim is:

1. Polymeric masses comprising a polymerized alpha hydrocarbonoxy-substituted acrylonitrile.

2. Copolymers comprising an alpha hydrocarbonoxy-substituted acrylonitrile interpolymerized with a butadiene.

3. Polymeric masses comprising at least one polymerized alpha hydrocarbonoxy-substituted acrylonitrile.

4. Polymeric masses comprising a polymerized alpha alkoxy substituted acrylonitrile.

5. Copolymers comprising an alpha hydrocarbonoxy-substituted acrylonitrile interpolymerized with a polymerizable vinyl monomer.

6. Copolymers comprising an alpha alkoxy substituted acrylonitrile interpolymerized with a polymerizable vinyl monomer.

7. Copolymers comprising an alpha alkoxy substituted acrylonitrile interpolymerized with a butadiene.

8. A copolymer comprising alpha methoxy acrylonitrile interpolymerized with butadiene-1,3.

9. A copolymer comprising alpha ethoxy acrylonitrile interpolymerized with butadine-1,3.

10. A copolymer comprising alpha butoxy acrylonitrile interpolymerized with butadiene-1,3.

11. Polymeric masses comprising a polymerized alpha substituted acrylonitrile from the class consisting of alpha hydrocarbonoxy, furyl-oxy, and furfuryl-oxy substituted acrylonitriles.

12. Copolymers comprising a polymerizable vinyl monomer interpolymerized with an alpha substituted acrylonitrile from the class consisting of the hydrocarbonoxy, furyl-oxy, and furfuryl-oxy substituted acrylonitriles.

13. A copolymer comprising butadiene-1,3 interpolymerized with an alpha substituted acrylonitrile from the class consisting of the hydrocarbonoxy, furyl-oxy, and furfuryl-oxy substituted acrylonitriles.

ALBERT M. CLIFFORD.